United States Patent
Harris

[11] Patent Number: 5,967,134
[45] Date of Patent: Oct. 19, 1999

| [54] | LIQUID GAS GRILL APPARATUS AND METHOD |
|---|---|
| [75] | Inventor: Jack C. Harris, Dale, Ind. |
| [73] | Assignee: Visionary Solutions, LLC, Des Plains, Ill. |
| [21] | Appl. No.: 09/128,717 |
| [22] | Filed: Aug. 4, 1998 |

Related U.S. Application Data

[60] Provisional application No. 60/054,895, Aug. 4, 1997.

[51] Int. Cl.⁶ ..................................... A47J 37/00
[52] U.S. Cl. ......................... 126/41 R; 126/20; 126/276
[58] Field of Search ...................... 126/512, 519, 126/41 R, 38, 5, 506, 20, 25 R, 276; 431/125, 126, 353; 99/444, 447

[56] References Cited

U.S. PATENT DOCUMENTS

| 3,104,814 | 9/1963 | Boerder ................................. 431/125 |
| 3,455,291 | 7/1969 | Glass ....................................... 126/519 |
| 3,830,217 | 8/1974 | Maness et al. ......................... 126/519 |
| 3,892,519 | 7/1975 | Reed et al. ............................. 431/353 |

OTHER PUBLICATIONS

"Porous Plastics," 1996, 4 pages, Porex Technologies Corp., Fairburn, Georgia.

"Porex Technologies," 1995, 30 pages, Porex Technologies Corp., Fairburn, Georgia

*Primary Examiner*—James C. Yeung
*Attorney, Agent, or Firm*—Sanford J. Piltch

[57] ABSTRACT

A liquid gas grill providing small bubbles of gas in a nonflammable liquid bath, such as a water bath, beneath the surface of the water, wherein the small bubbles of gas are ignited on the surface of the water creating a flame for heating and cooking food articles suspended thereabove.

10 Claims, 11 Drawing Sheets

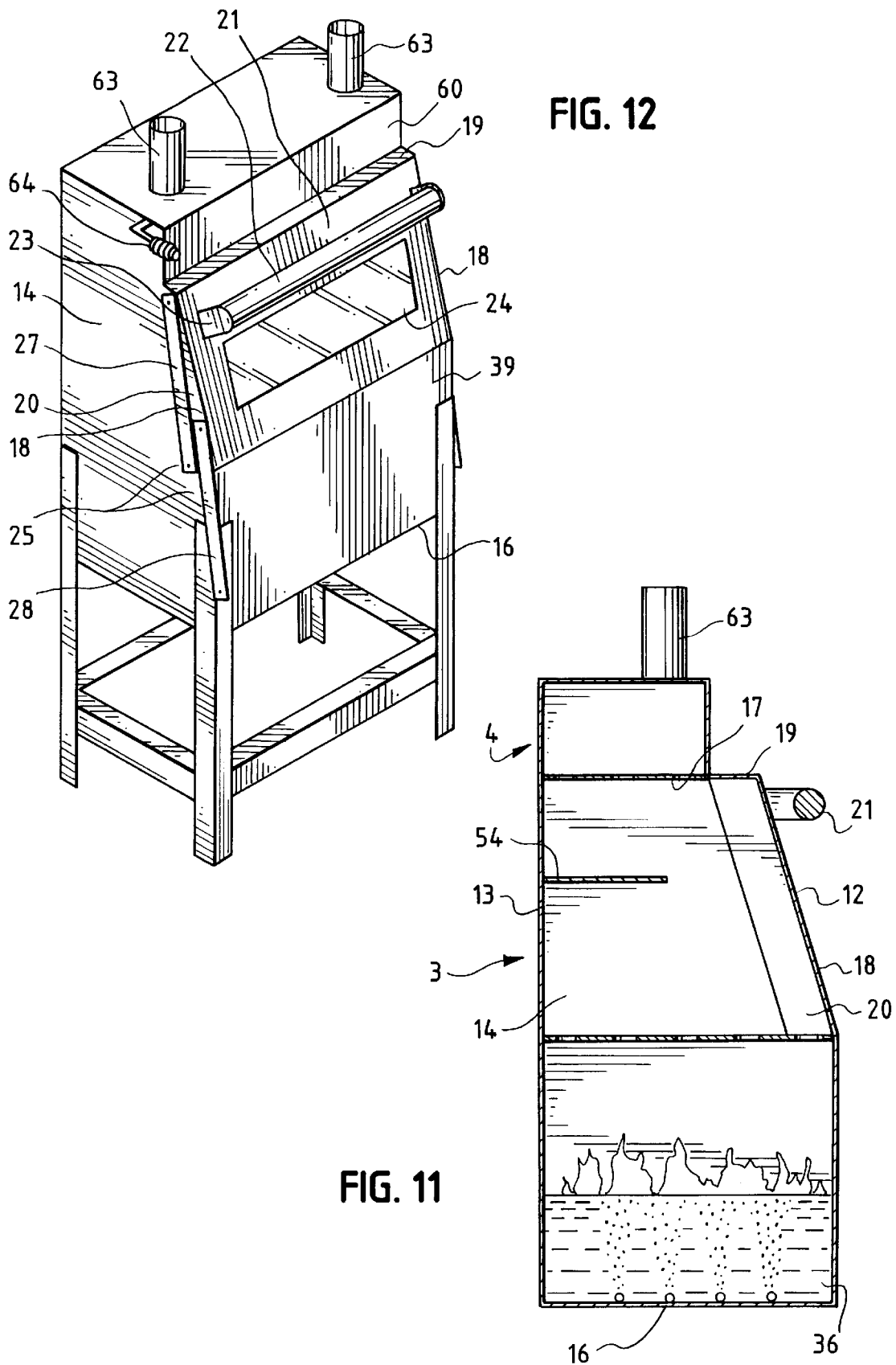

LIQUID GAS GRILL APPARATUS AND METHOD

CROSS-REFERENCE TO RELATED APPLICATION

This application is a continuation-in-part of U.S. provisional pat. application Ser. No. 60/054,895, filed Aug. 4, 1997.

FIELD OF THE INVENTION

This invention relates generally to gas grills used for cooking food articles, outdoors and indoors.

BACKGROUND INFORMATION

Traditionally gas grills have been utilized in the food industry for cooking food articles, particularly, meat. A desirable flavor is imparted to the food articles due to the direct contact of the meat with the flames. Furthermore, gas grills utilizing pressurized gas tanks are portable and convenient for camping and the like.

However, one disadvantage of conventional gas grills is that they impart an "off-flavor" to the food article due to the chemical composition of the gas. Gas available to consumers, such as propane, is usually mixed with an agent having a strong odor to enable the user to smell the gas as a safety precaution. Sometimes the agent is a sulfur derivative and has an odor characteristic of rotten eggs.

Another disadvantage to conventional gas grills is that they dry out the food, leaving meat for example, tough. This drying effect is caused by an extended application of flames to the food and evaporation of the food moisture, without any effective means for returning moisture to the food.

Yet another disadvantage with conventional gas grills is flare-ups. Flare-ups occur when a piece of fat or meat falls through the grill rack and lands on the gas burner. Because the burner gets extremely hot, the fallen food causes flames to increase and flare-up at that particular location. Flare-ups will overcook or even burn a portion of a food article. Therefore, cooks must constantly monitor the grill rack so they can extinguish any flare-ups that might occur.

Another problem with conventional gas grills is they have hot spots. Hot spots are the areas directly above the burners, which are much hotter than other locations on the grill rack. Hot spots cause portions of food articles to cook faster than others. Consequently, cooks must monitor the cooking and rearrange the food articles to ensure even cooking.

Another disadvantage with conventional gas grills is the smoke caused by flare-ups and charcoal burning in addition to charring of food. The smoke creates harmful emissions and the charred food results in the consumption of injurious carcinogens.

From all of the foregoing discussion, it is quite apparent that a significant need exists for a gas grill which addresses the recognized problems which have faced people for so long without a viable solution.

Accordingly, an object of the present invention is to provide a means of heating food articles over a direct flame, while adding moisture to the food articles to prevent them from drying out.

Another object of the present invention is to provide a means for keeping food articles warm through the flow of hot vapor over the food articles.

Another object of the present invention is to provide a means for cooking food articles through the use of entrapped, hot vapor.

Yet another object of the present invention is to provide flames that are evenly distributed over the entire area of the cooking surface, eliminating hot spots.

Another object of the present invention is to provide a means to prevent the gas from imparting an off-taste to the food.

An additional object of the present invention is to eliminate flare-ups.

Still another object of the present invention is to lower the emissions and carcinogens that are produced by conventional gas grills.

Another object of the present invention is to allow users to flavor food by adding flavoring to liquid located beneath the food.

An additional object of the present invention is to provide a gas grill that is easily cleaned.

Still another object of the present invention is to provide a gas grill that is safer to operate than conventional gas grills.

SUMMARY OF THE INVENTION

There now has been discovered a structure and a related method, for cooking food articles on a liquid gas grill. The structure comprises a bubbler, immersed in a liquid, which filters and disperses gas into the liquid. The gas rises to the liquid surface and departs from the surface, whereupon a hand-held grill lighter is used to ignite the gas, creating flames. A grill rack is located above the flames, upon which food is placed. The gas, having been filtered through the bubbler and the liquid, does not impart an off-taste to the food because off-tasting substances have been filtered out of the gas. Furthermore, as the food cooks, part of the liquid evaporates into hot vapor. An enclosure entraps the hot vapor, causing it to be partially absorbed into the food, preventing the food from drying out. Also, by adding food flavoring to the liquid, a desired taste is imparted to the food.

One aspect of the present invention involves a full size liquid gas grill. The grill consists of liquid compartments located beneath the grill rack. A bubbler is located at the bottom of each liquid compartment. The bubbler receives gas into one cavity from a single gas source and redirects the source into several diffusing tubes. The diffusing tubes are porous, and therefore they filter the gas and then distribute the gas into the liquid through a plurality of pores in the tubes.

The gas then rises to the top of the liquid and departs from the liquid surface. Once the gas has begun to depart, a user may ignite the gas by creating a spark above the liquid with a handheld grill lighter. The spark ignites the gas, creating continuous flames which "dance" over the surface of the liquid. Food is placed on a grill located above the flames. The cooking temperature may be adjusted by increasing or decreasing the liquid volume in the containers and by adjusting the flow from the gas source.

Located above the grill but still part of the grilling section, is a warming shelf which may be used to keep food warm, after it has been cooked. The warming rack is located far enough away from the flames so that food placed on it will not cook.

Located above the warming shelf is an upper compartment which cooks food with hot vapor, emanating from the liquid compartments. The upper compartment has one or more small openings at its bottom, allowing hot vapor to enter the compartment. A vent is located at its top. Opening and closing of the vent allows for the temperature in the upper compartment to be regulated. Food articles such as bread and potatoes can be cooked in the upper compartment.

In accordance with another aspect of the present invention, a conversion kit provides a means for converting a conventional gas or charcoal grill into a liquid gas grill. The structure comprises a container which fits beneath the grill. In conventional grills, the charcoal or gas burners are removed, leaving an empty space. The container is placed in the empty space, fitting under the grill rack. A bubbler is mounted at the bottom of the container, and a gas source feeds into the bubbler. The container is filled with a liquid, covering the bubbler. When the gas source is turned on, a user may ignite the flames above the liquid by using a hand-held grill lighter.

A portable liquid gas grill, according to another aspect of the current invention, is used for cooking in situations where a portable grill is necessary, such as when camping. Like the full size version, it includes a bubbler and liquid compartments. It is approximately ⅕ of the size of the full size liquid gas grill.

BRIEF DESCRIPTION OF THE DRAWINGS

For the purpose of illustrating the invention, there is shown in the drawings forms which are presently preferred; it being understood that the invention is not limited to the precise arrangements and instrumentalities shown.

FIG. 11 is a left side view of the liquid gas grill of the present invention.

FIG. 12 is a perspective view of the liquid gas grill of the present invention.

DETAILED DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
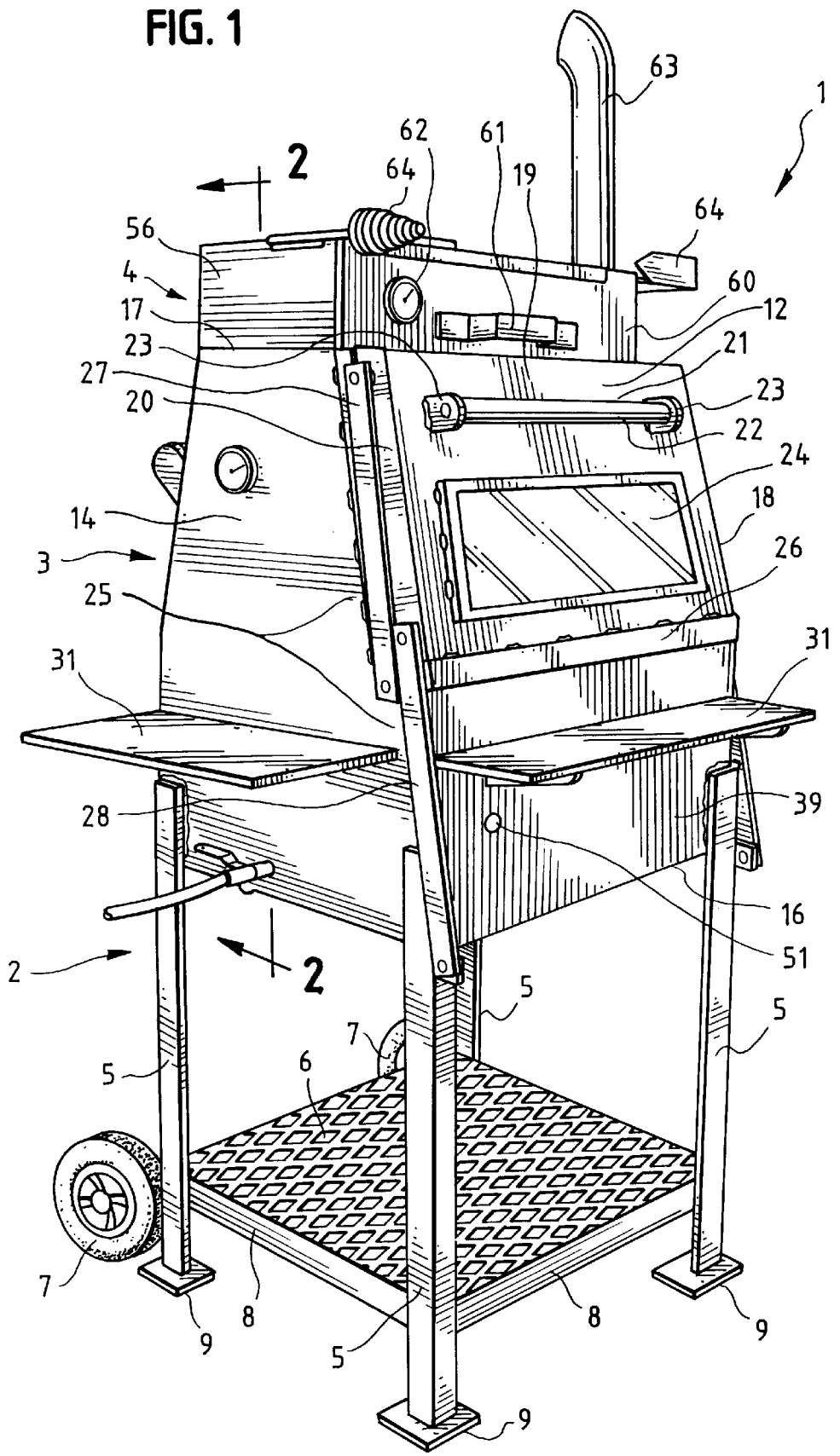
FIG. 1 is a perspective view of the liquid gas grill of the present invention.

Referring now to the drawings in detail, where like numerals refer to like parts or elements, and in particular to FIG. 1, there is shown a full size liquid gas grill structure 1. Structure 1 preferably comprises a standing structure 2, a main compartment 3, and an upper compartment 4. Preferably, structure 1 has the following approximate dimensions: five feet in height, 18 inches in width, and 30 inches in length.

The lower part of structure 1, standing structure 2, consists of legs 5, shelf 6, and wheels 7. Shelf 6 stabilizes legs 5 and allows for the storing of articles such as utility items, for example, gas tanks, buckets, and hand-held grill lighters. Wheels 7 enable users to tilt and roll structure 1 from place to place. Shelf 6 is attached to border 8 for stability. Shelf 6 is preferably formed with a plurality of openings in its surface, preventing any liquid spillage from collecting on its surface. Shelf 6 may be formed of mesh wire or alternatively, sheet metal, punched with a uniform pattern of openings extending through its surface. Border 8 consists of four flat, rectangular strips of metal which are attached, preferably welded, to shelf 6, as shown in FIG. 1.

As shown in FIG. 1, each of the four legs 5 are identical in size and shape. Each leg 5 comprises a flat, rectangular strip of metal which is bent along its longitudinal axis, so as to form a 90 degree angle at the bend. This bend provides each leg with increased stability, enabling it to withstand greater dynamic and static forces without deforming. Legs 5 further comprise feet 9 which consist of flat pieces of metal welded to the bottom of each leg 5. Feet 9 may be made in any flat shape, though a square or rectangular shape is preferred. Legs 5 are welded to main compartment 3, as shown in FIG. 1.

Figure 3:
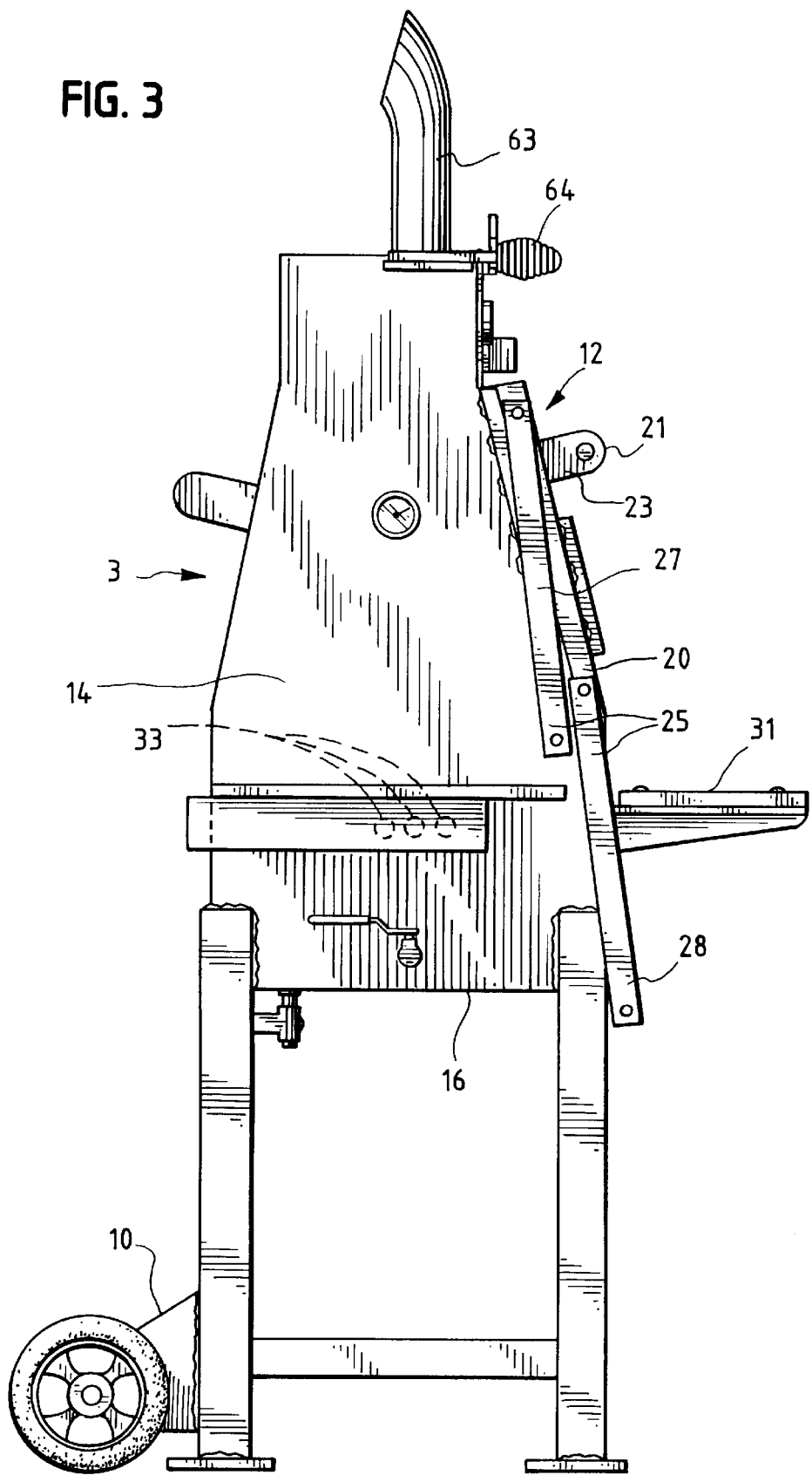
FIG. 3 is a left side view of the liquid gas grill of the present invention.
Figure 4:
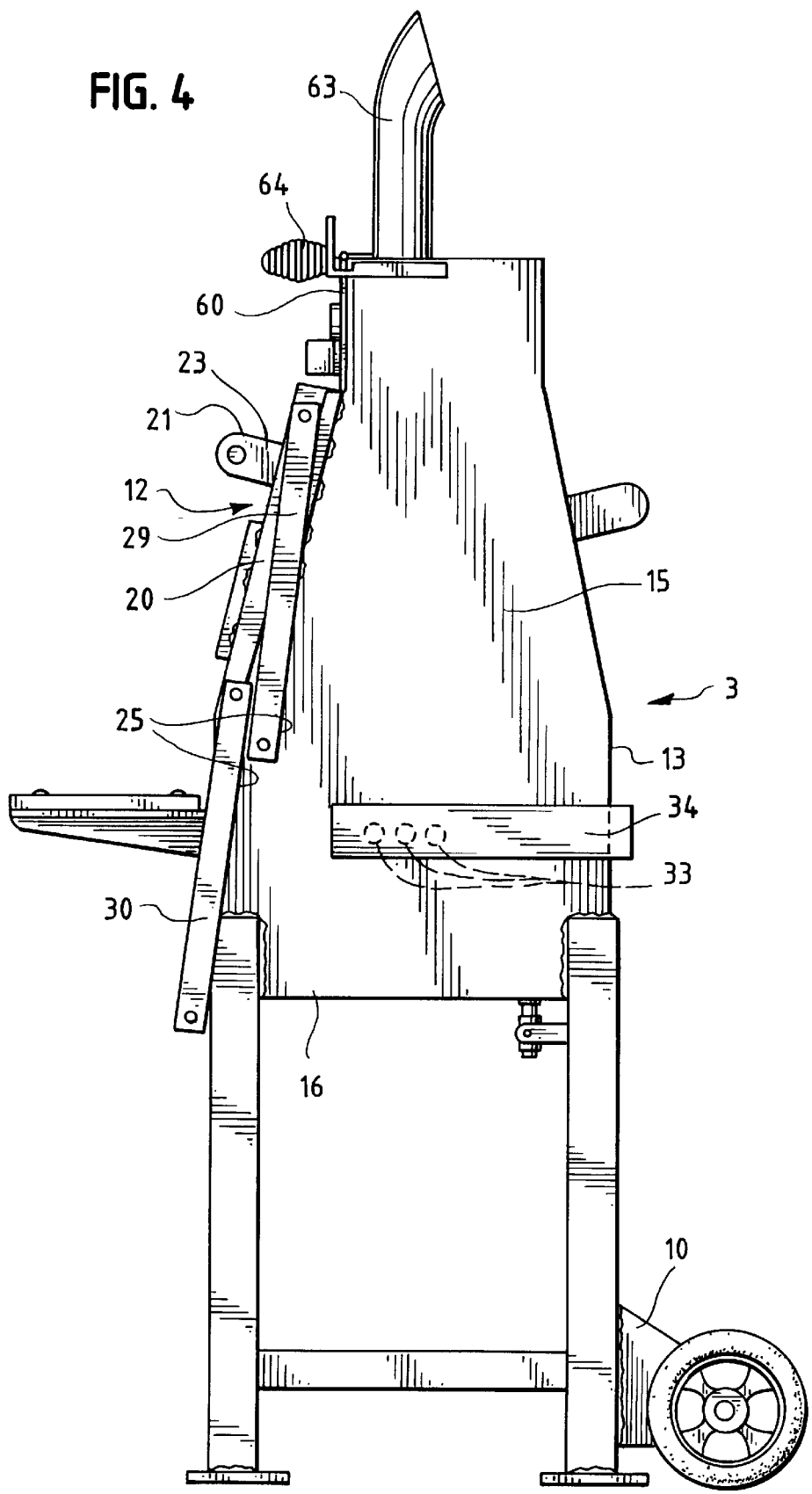
FIG. 4 is a right side view of the liquid gas grill of the present invention.
Figure 5:
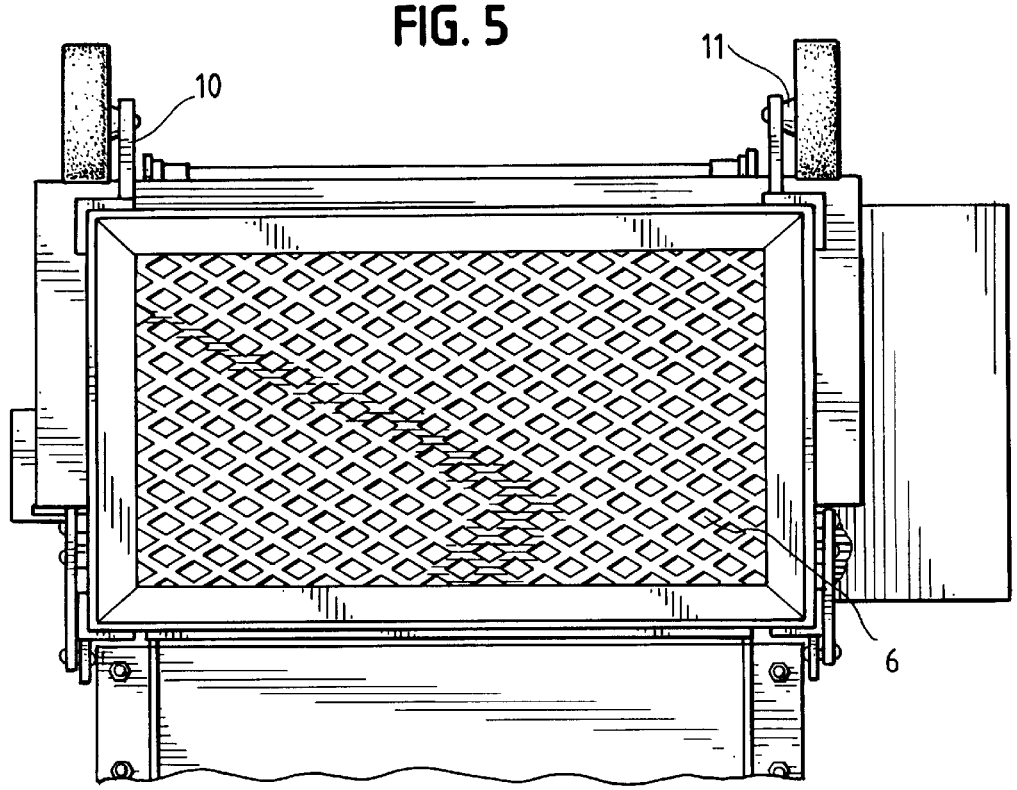
FIG. 5 is a bottom view of the liquid gas grill of the present invention.
Figure 6:
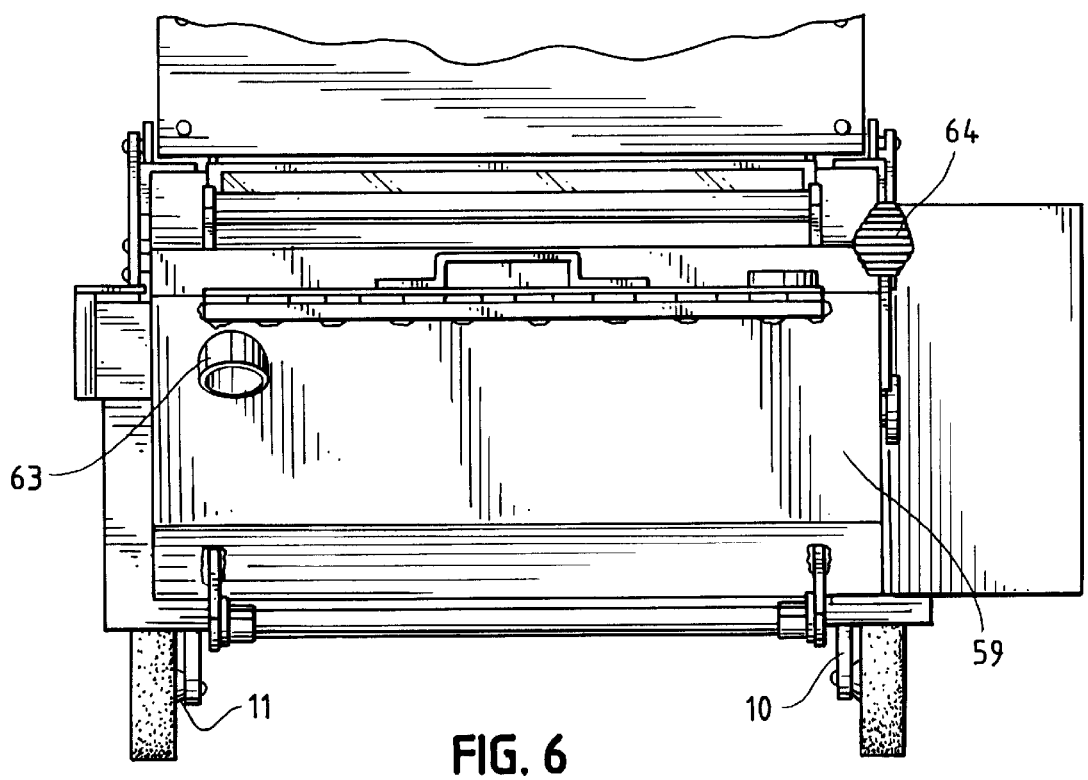
FIG. 6 is a top view of the liquid gas grill of the present invention.

As shown in FIGS. 3, 4, and 5, members 10 connect the axles 11 of wheels 7 to two rear legs 5. Members 10 are each separately welded to a rear leg 5. A hole is bored into members 10 which is large enough in diameter to receive the axles 11 of the wheels 7. Axle 11 may consist of a bolt which may be attached to member 10 by means of a nut.

Main compartment 3, as shown in FIGS. 1, 3, 4, 7 and 11, generally comprises a six sided structure consisting of a door 12, a back wall 13, a left wall 14, a right wall 15, a bottom wall 16, and a top wall 17. The walls of main compartment 3 consist of sheets of metal, joined together at a weld joint along the entire length of their edges.

As shown in FIG. 1, door 12 comprises side edges 18 and top edge 19. Lip 20, a straight, rectangular strip of metal is welded to side edges 18, forming a 90 degree angle with the surface of door 12. When door 12 is closed, lips 20 form a seal with left wall 14 and right wall 15. Handle 21 is also connected to door 12, facilitating its opening and closing. Handle 21 comprises a bar 22, made of metal, wood, or plastic, welded or fastened by any other suitable means to spacers 23 on each of its ends, which in turn are welded to the door 12, as shown in FIG. 1. Furthermore, door 12 includes a window 24. A rectangular hole is cut into door 12. Straight strips of metal are welded along the bottom and side edges of the hole, on the interior of door 12, forming a slot for receiving glass. Various types of glass may be used, however tempered glass is preferred. Window 24 is easily removed and cleaned due to the slot fit.

As shown in FIGS. 1 and 4, door mechanism 25 comprises a system of five flat bars (bar 26, bar 27, bar 28, bar 29, and bar 30) which are hingedly connected to the door 12, main compartment 3, and legs 5. Bar 26 is welded to the main compartment 3, providing pivot points at its ends. As shown in FIG. 1, the upper portion of bar 27 is hinged to lip 20, and the lower portion of bar 27 is hinged to bar 26. Bar 28 has its upper portion hinged to lip 20 and its lower end portion hinged to front leg 5. Similarly, as shown in FIG. 4, the upper portion of bar 29 is hinged to lip 20, and the lower portion of bar 29 is hinged to main compartment 3. Bar 30 has its upper portion hinged to lip 20 and its lower end portion hinged to front leg 5. The hinges in door mechanism 25 may consist of rivets, shoulder bolts, or any other suitable fastener.

As seen in FIG. 1, folding shelves 31 are attached to main compartment 3 by means of hinges extending along the length of the folding shelves 31. The hinges may be attached to main compartment 3 by means of weld joints or any other suitable fastener means. Any of the various types of folding shelves may be utilized. Preferably, the shelves are made of wood. Cooking utensils, food condiments, and the like may be placed on folding shelves 31 while food is being prepared.

When door 12 is opened, it swings about in an arc path, clearing folding shelf 31. The door 12 remains in a vertical position during its travel. This way, when the door 12 is opened, the heat does not flow directly into the user's face because the door serves as a shield, deflecting the heat flow at all times away from the user.

Figure 7:
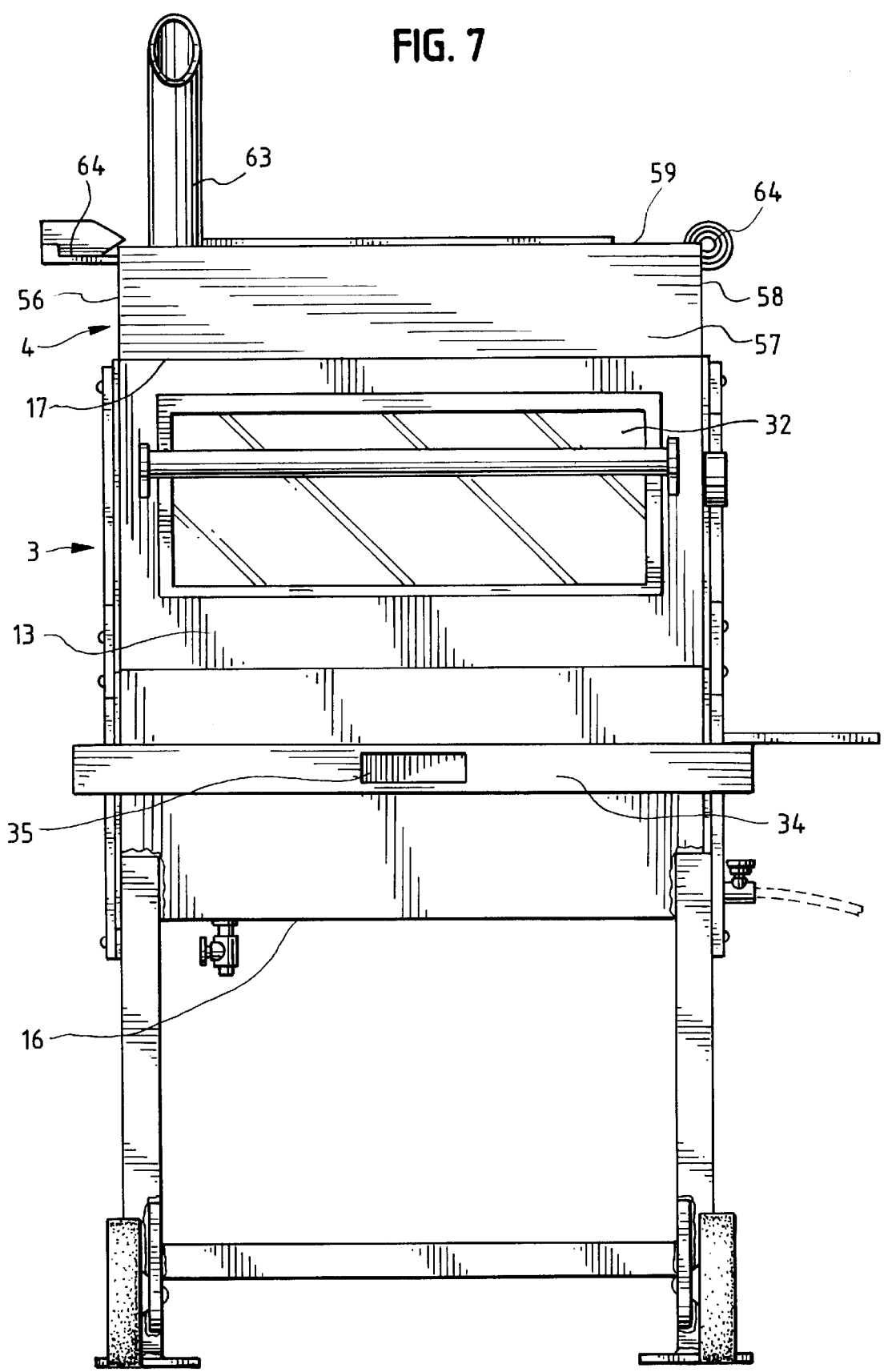
FIG. 7 is a rear view of the liquid gas grill of the present invention.

As shown in FIG. 7, back wall 13 includes a window 32. A rectangular hole is cut into back wall 13. Straight strips of metal are welded along the bottom and side edges of the hole, on the interior surface of back wall 13, forming a slot for receiving glass. Various types of glass may be used, however tempered glass is preferred. Glass is cut to a dimension slightly smaller than that of the slot and inserted into the slot. Window 32 is easily removed and cleaned due to the slot fit.

As can be seen in FIGS. 31, and 4 vent holes 33 are made in left wall 14 and right wall 15. Vent holes 33 allow air to enter the inside of main compartment 3, which aids the cooking process. An air duct 34 is used to ensure that equal amounts of air enter left wall 14 and right wall 15. Air duct 34 comprises a rectangular shaped duct which covers vent holes 33 on left wall 14 and right wall 15, and the air duct 34 leads to the back wall 13, where an opening 35 is made in air duct 34. Air may only enter holes 33 by first entering opening 35 in air duct 34. This allows for equal distribution of air flow to the walls of main compartment 3. Air duct 34 is welded to main compartment 3.

In order to monitor the cooking temperature, a thermometer is embedded in left wall 14 or right wall 15. The preferable location for the thermometer is approximately two inches above the cooking surface.

Figure 2:
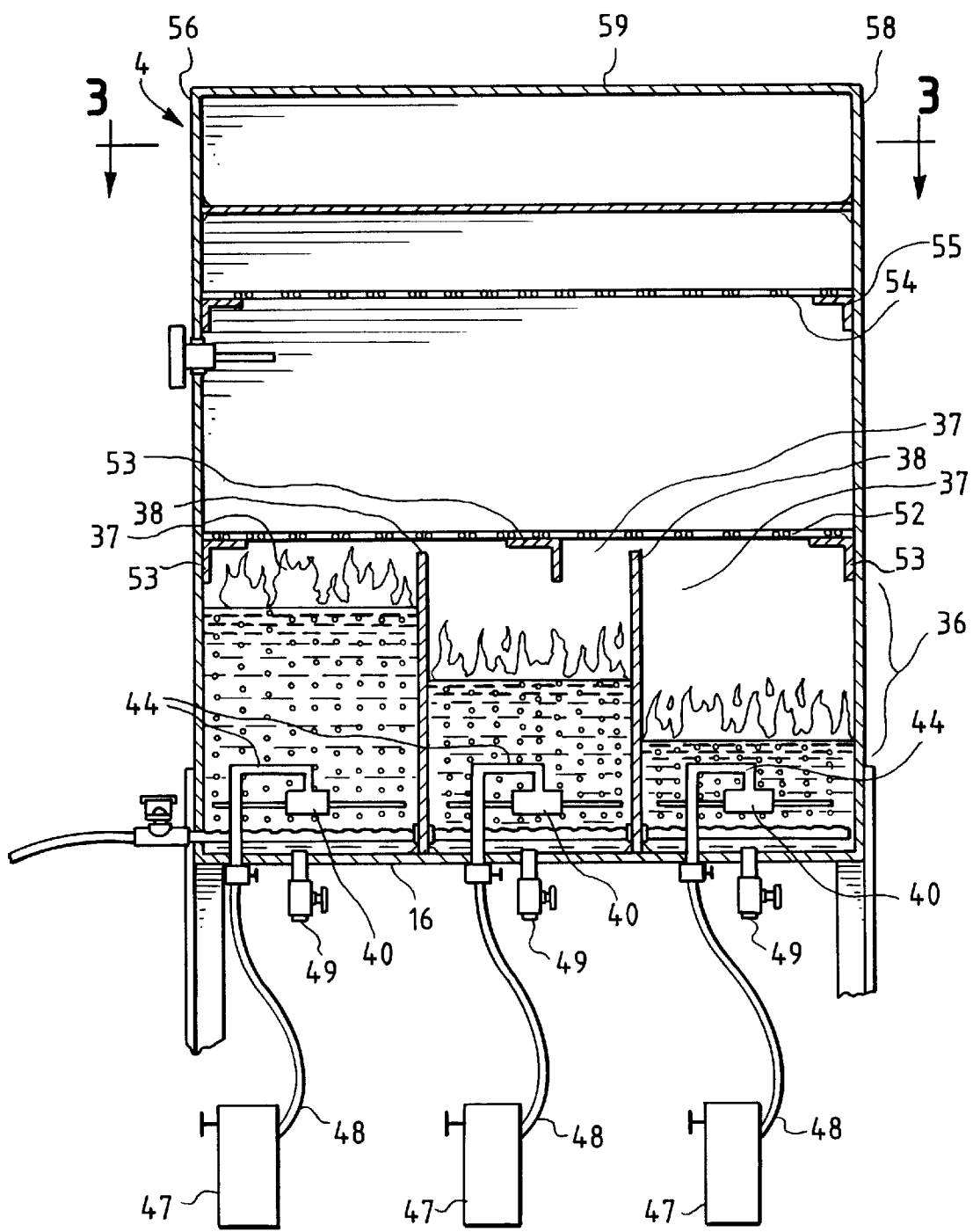
FIG. 2 is a front cutaway view of the liquid gas grill of FIG. 1.

As can be seen in FIG. 2, inside main compartment 3, a liquid system 36 is mounted on bottom wall 16. FIG. 2 shows three liquid compartments 37, though any number of liquid compartments may be used. Each of the liquid compartments 37 is self-contained. The liquid compartments 37 are separated by means of partition walls 38 which each extend from front wall 39 to back wall 13. Partition walls 38 are welded to front wall 39 and back wall 13. Liquid compartments 37 are filled with non-flammable liquids, preferably water. Also, food flavoring may be added to the liquid compartments 37.

Figure 15:
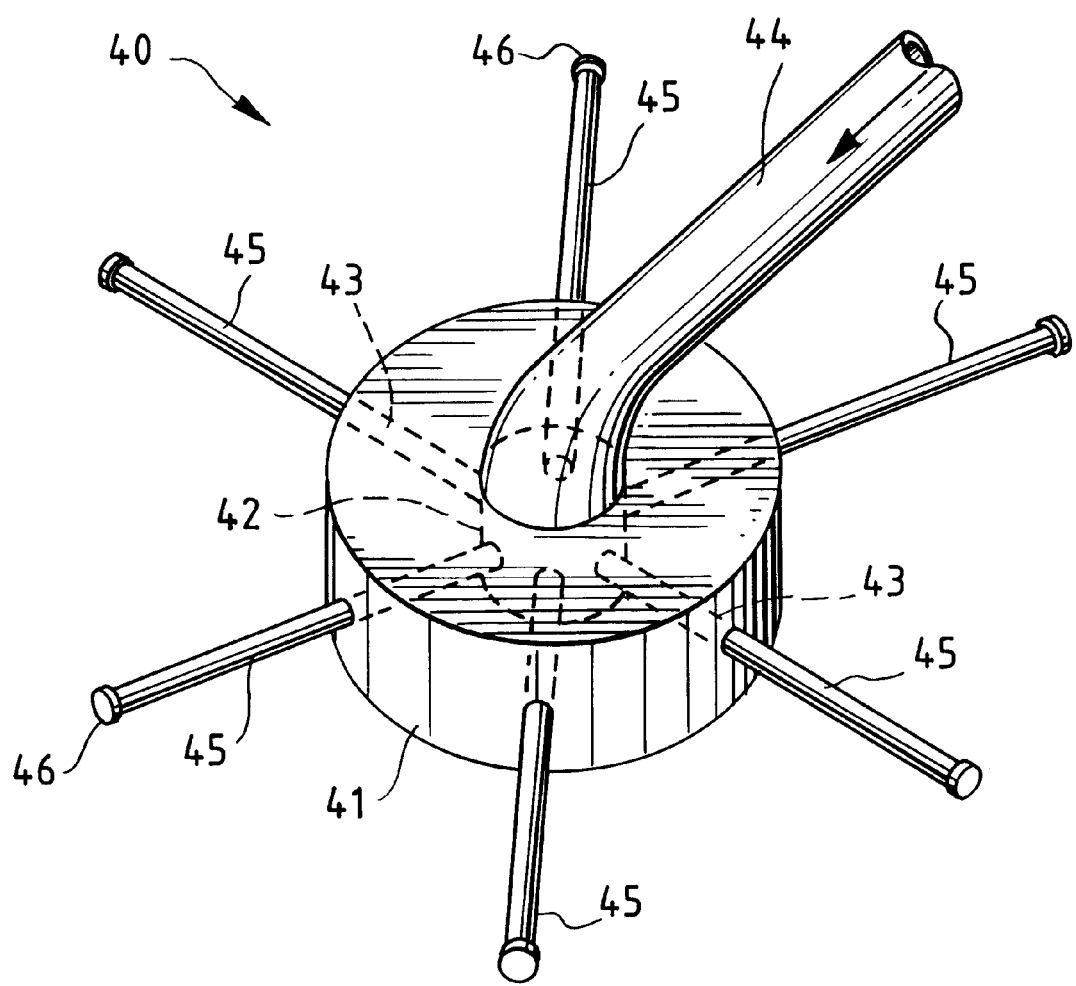
FIG. 15 is a perspective view of the bubbler of the present invention.

As shown in FIG. 2, bubblers 40 are located on the inside of each liquid compartment 37, mounted on bottom wall 16. A bubbler 40 comprises a manifold having one or more inlets to receive gas and a plurality of outlets, dispersing the gas flow into relatively tiny bubbles. In a preferred embodiment, shown in FIG. 15, a bubbler 40 is formed from a solid cylindrical portion 41 of aluminum, stainless steel, or plastic. The center of the cylindrical portion 41 has a longitudinal bore 42, part way through its length. Radial bores 43 are made radially, extending through the walls of cylindrical portion 41, until coming into direct communication with longitudinal bore 42. Longitudinal bore 42 is threaded to receive connecting tube 44. The end of connecting tube 44 is threaded so that it can be screwed into longitudinal bore 42. Connecting tube 44 carries gas to cylindrical portion 41. Radial bores 43 are threaded to receive diffusing tubes 45. Diffusing tubes 45 have ends proximate to cylindrical portion 41 that are threaded so as to be screwed into radial bores 43. The distal ends of diffusing tubes 45 are also threaded. Threaded caps 46 are screwed onto the distal ends to block any flow of gas out of the ends of diffusing tubes 45. Diffusing tubes 45 are made of a porous material, allowing gas to escape out of small pores located over the entire surface area of the diffusing tubes 45. Preferably, a commercially available product, POREXO®, is used as the material for the diffusing tubes 45. POREX® is made of polyethylene and has an approximate pore size of 20 microns. As shown in FIG. 2, a hose 48 is connected to each tank 47, and the free end of the hose 48 is attached to a connecting tube 44. The attachment is accomplished by use of any suitable fastening means, such as a clamp.

Each of the bubblers 40 are connected to their own separate gas source. The sources provided are preferably tanks 47, filled with pressurized gas. The tanks 47 may be placed on shelf 6. The gas from the tanks 47 passes through hose 48 and connecting tube 44, which separately carry gas to cylindrical portions 41.

Also connected to bottom wall 16, are liquid valves 49 that allow users to empty the liquid from liquid compartments 37. The liquid may be emptied into a bucket placed on top of shelf 6. Liquid valves 49 also enable users to clean main compartment 3 by using an ordinary garden hose to spray inside the liquid compartments 37.

By turning on the tanks 47, gas will make its way through hose 48, connecting tubes 44, cylindrical portions 41, diffusing tubes 45, and up through the liquid. When moving through the liquid, the bubbles are dispersed and become regularly distributed over the entire liquid surface. The cause for the dispersal and regular distribution is the radial design of the preferred bubbler 40, the diffusing tubes 45, and the natural movement of the liquid, due to wind and vibrations on the ground or floor. Furthermore, the gas passing through the diffusing tube 45 and the liquid, removes the off-taste from the gas, preventing the gas from imparting such off-taste to the food.

Figure 8:
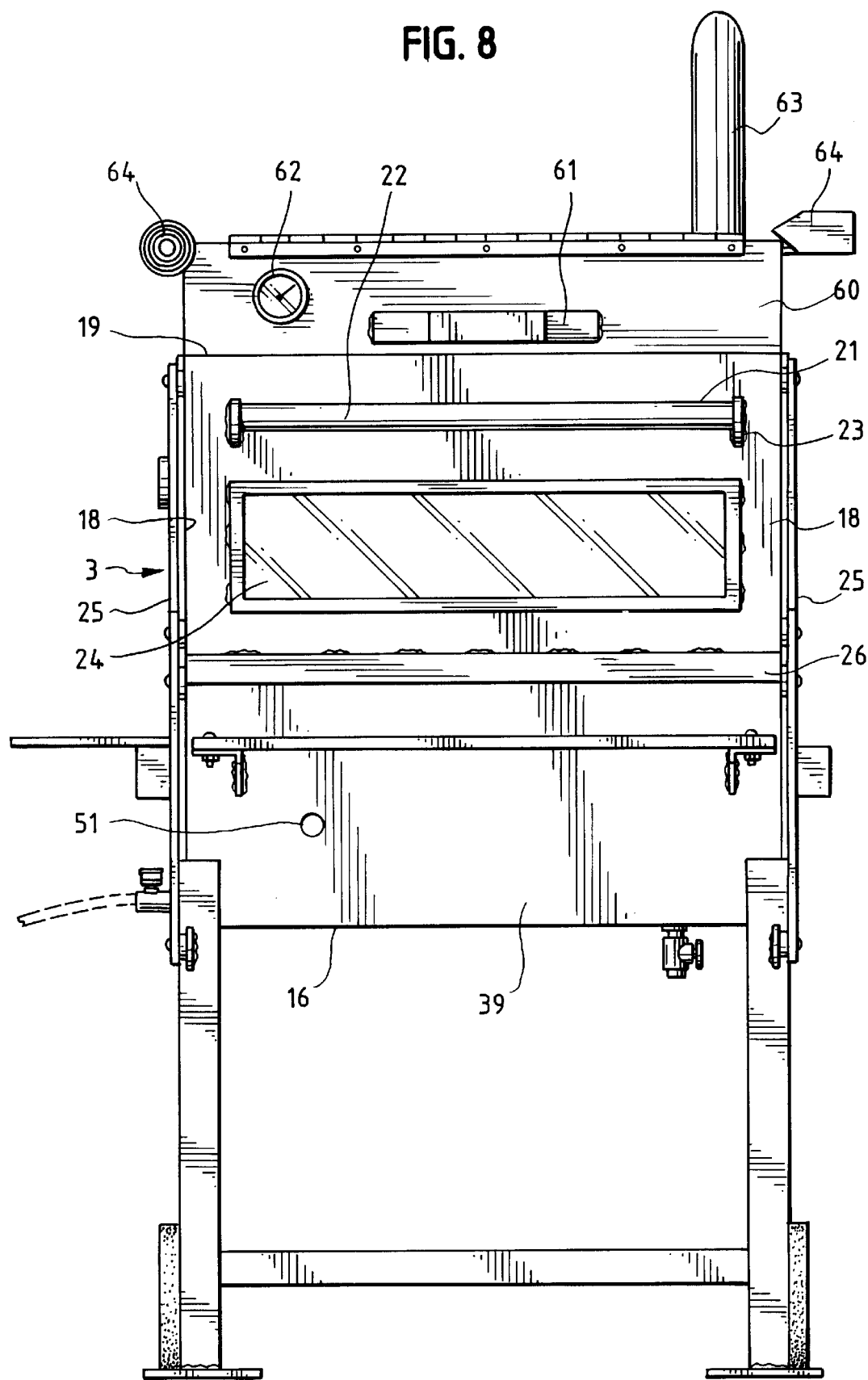
FIG. 8 is a front view of the liquid gas grill of the present invention.
Figure 9:
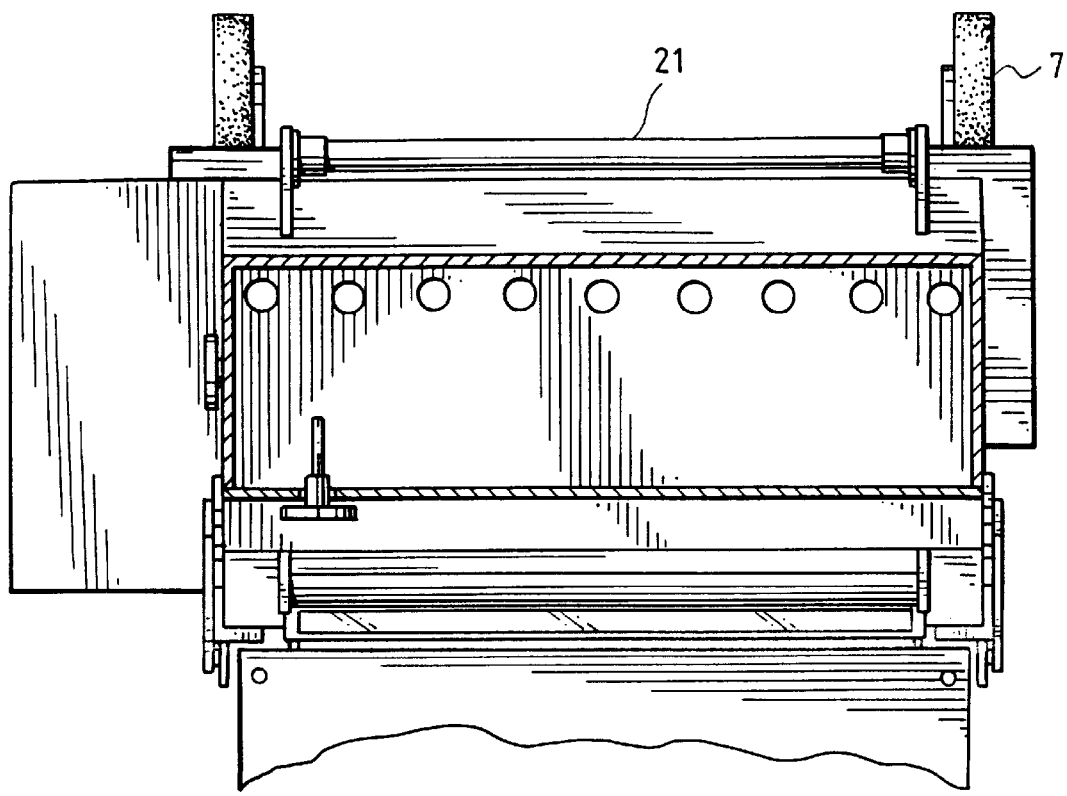
FIG. 9 is a top cutaway view of the liquid gas grill of the present invention.
Figure 10:
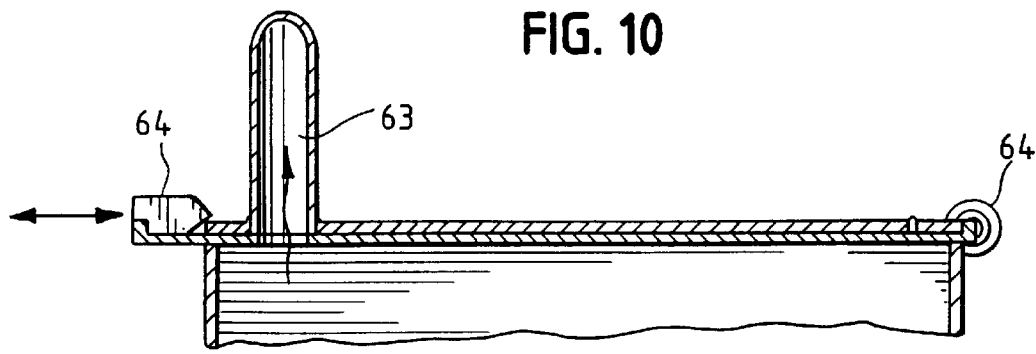
FIG. 10 is a front sectional view of the liquid gas grill of the present invention.

After the gas departs from the liquid surface, a user may ignite the gas using a hand-held grill lighter (not shown). As shown in FIGS. 1 and 8, lightning hole 51 is made in front wall 39, allowing users to insert their grill lighters through the lighting hole 51 and to ignite the gas. The ignition results in a plurality of flames dispersed over the entire area of the liquid surface of liquid compartments 37.

As shown in FIG. 2, a grill rack 52 is located above the flames. Grill rack 52 is preferably made of cast aluminum, though it may be made of stainless steal or another material that will resist rusting and withstand flames. Grill rack 52 comprises a flat surface having a plurality of openings through is surface. Grill rack 52 rests upon a support formed by four flat, rectangular metal strips 53, which are welded to the interior of main compartment 3. Strips 53 may be bent upon their longitudinal axis, forming a 90 degree angle. Alternatively, strips 50 may be used without bending. Each of the strips 53 are welded to the interior of main compartment 3, located the same distance from the flames. A first strip 53 is cut to a length equal to the width of left wall 14 and welded on the interior of left wall 14. A second strip 53 is cut to a length equal to the width of right wall 15 and welded on the interior of right wall 15. A third strip 53 is cut to a length equal to the width of back wall 13 and welded on the interior of back wall 13. A fourth strip 53 is cut to a length equal to the width of front wall 39 and welded on the interior of front wall 39. These four strips, welded above the flame, form a support for grill rack 52, and provide enough force to support the food articles that are placed on grill rack 52. Also, a user may remove the grill rack 52 for cleaning.

As seen in FIGS. 2 and 11, main compartment 3 also comprises a warming shelf 54 for keeping food warm after it has been cooked. Warming shelf 54 is preferably made of cast aluminum, though it may be made of stainless steal, mesh wire, or another material that will resist rusting and withstand flames. Warming shelf 54 comprises a flat surface having a plurality of openings, allowing heat and vapor from the flames to reach the food and keep it warm.

Furthermore, as shown in FIG. 2, warming shelf 54 is located above grill rack 52, and 1 it rests upon a support formed by three flat, rectangular metal strips 55 which are welded to the interior of main compartment 3. Strips 55 may be bent upon their longitudinal axis, forming a 90 degree angle. Alternatively, strips 55 may be used without bending. Each of the strips 55 are welded to the interior of main compartment 3, located the same distance from and above grill rack 52. A first strip 55 is cut to a length equal to the width of left wall 14 and welded on the interior of left wall 14. A second strip 55 is cut to a length equal to the width of right wall 15 and welded on the interior of right wall 15. A third strip 55 is cut to a length equal to the width of back wall 13 and welded on the interior of back wall 13.

As seen in FIGS. 1, 2, and 7, an upper compartment 4 is comprised of a top wall 17, upper left wall 56, upper back wall 57, upper right wall 58, upper top wall 59, and upper door 60, all of which are formed from rectangular, flat sheets of metal. As shown in FIGS. 2 and 7, top wall 17, upper left wall 56, upper back wall 57, upper right wall 58, and upper top wall 59 are joined together along their edges by means of weld joints. Top wall 17 comprises one or more openings in its surface, allowing heat and vapor to enter upper compartment 4. Upper door 60 comprises a flat, rectangular sheet of metal which is hinged along its upper edge to upper top wall 59. As shown in FIGS. 1 and 8, an upper handle 61, comprising a flat strip of sheet metal, bent into a u-shape, is welded to the outside of upper door 60. A thermometer 62 is embedded in upper door 60, allowing users to measure the temperature of the upper compartment 4 while cooking. In addition, a vent 63 is located on upper top wall 59. Vent 63 consists of a metal pipe which is threaded into or welded onto an opening in upper top wall 59. Further, regulators 64 allow users to adjust the size of the vent opening, effectively regulating the flow of heat and vapor through the upper compartment 4. Regulators 64 may consist of a flat piece of metal that can gradually be advanced over the vent opening.

Structure 1 operates as follows: door 12 is opened and liquid such as water must be added to the liquid compartments 37. Food is placed on grill rack 52, over the various liquid compartments 37. Users may increase or decrease the liquid level of each liquid compartment 37 by opening door 12 and pouring liquid into the liquid compartments 37 or by opening liquid valves 49 to drain out liquid into one or more buckets. Users may add spice, sauce, or other food flavoring to the liquid. As the liquid level is increased, the heat intensity delivered to a food article increases, resulting in faster cooking. Therefore, as shown in FIG. 2, for example, a thick steak might be placed over the left liquid compartment 37, chicken may be placed over the middle liquid compartment 37 , and vegetables may be placed over the right liquid compartment 37.

Next, the user closes door 12 and turns on the gas by adjusting knobs on the tanks 47. The gas enters the bubblers 40 and gas bubbles are dispersed into the liquid. The bubbles rise to the liquid surface in a uniformly distributed pattern that covers the entire liquid surface area. The user then inserts grill lighter through a lighting hole 51, creating a spark over the liquid surface, and igniting the gas. After cooking a food article, a user may keep the food warm by opening door 12 and storing the food on warming shelf 54. Also, a user may open upper door 60 and place food articles in the upper compartment 4, such as potatoes or frozen vegetables. Users may adjust the cooking temperature in the upper compartment 4 by adjusting the regulators 64 which, in turn, increases or decreases the size of the vent 63 opening. The greater the opening, the faster the cooking.

While cooking the food on grill rack 52, users do not have to constantly monitor the grill for flare-ups because flare-ups are eliminated. However, if they so desire, users may make occasional viewings through windows 24 and 32. The liquid gas grill eliminates the hot spots because the flames are evenly distributed over the entire liquid surface area. Also, the evaporation of the liquid throughout the cooking process, fills main compartment 3 with vapor and prevents the food from drying out.

The folding shelves 31 may be raised and used to hold prepared food, utensils, and condiments. After the food is cooked, users may turn off the gas tank supply and open liquid valves 49, allowing the liquid to drain out. Next, users may remove and clean the grill rack 52. Users may also use a water hose to clean the liquid compartments 37, by spraying them down with water. Finally, structure 1 may be tilted and wheeled away.

Figure 13:
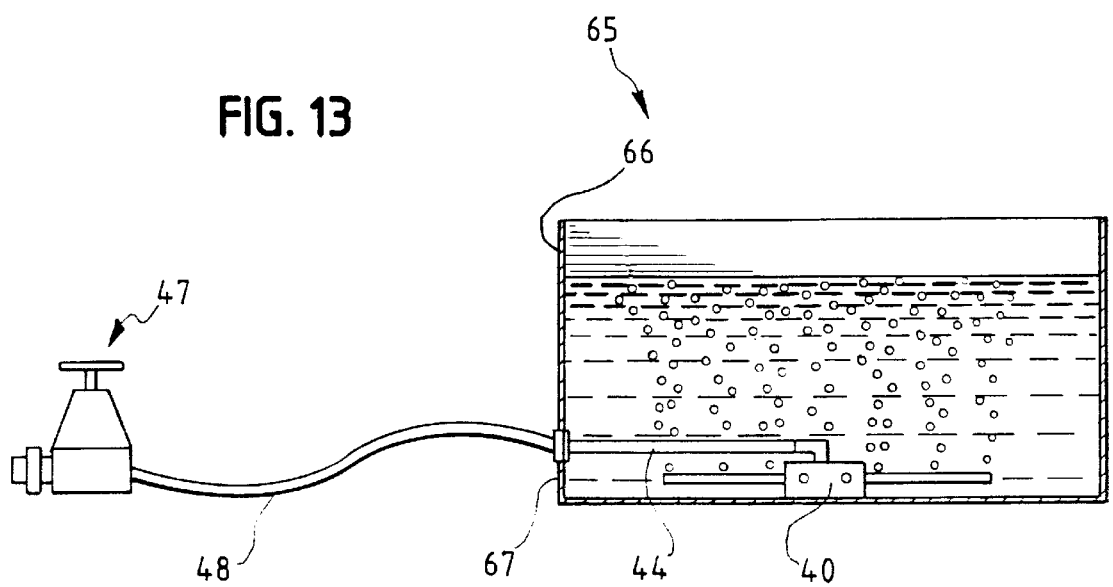
FIG. 13 is a side view of the liquid gas grill conversion kit of the present invention.

In a particular embodiment shown in FIG. 13, there is shown a conversion kit structure 65. Conversion kit structure 65 preferably comprises a liquid container 66 made of aluminum or stainless steel. Liquid container 66 may vary in geometry and size so that it fits inside the fuel cavity of a conventional grill. A bubbler 40 is mounted to the bottom surface of liquid container 66 by means of a weld joint or another suitable fastener. Connecting tube 44 is connected to bubbler 40, as described earlier. The distal end of connecting tube 44 extends through an opening in the wall of liquid container 66. To prevent leaking, a water tight bulkhead fitting 67 is used to join connecting tube 44 to hose 48. One end of hose 48 is connected to connecting tube 44 with bulkhead fitting 67. The other end of hose 48 is connected to tank 47.

As shown in FIG. 13, a conversion kit structure 65 enables users to convert their conventional gas or charcoal grills into liquid gas grills. To convert a conventional gas grill, users must remove the gas burners from their gas grills. This may usually be accomplished without any tools since the burners are freely movable. Next, users must insert the liquid container 66 into the empty space previously occupied by the gas burners. The grill rack 52 must be returned to its original location, now covering the liquid surface. Tank 47 may be placed on the ground or floor. Next, users must turn on the gas flow at tank 47. Users must then use a grill lighter 50 to ignite gas above the liquid surface. The users may then cook food on their converted conventional grills.

The same steps are required for converting and using a charcoal grill except, instead of removing gas burners, user must remove all charcoal.

Figure 14:
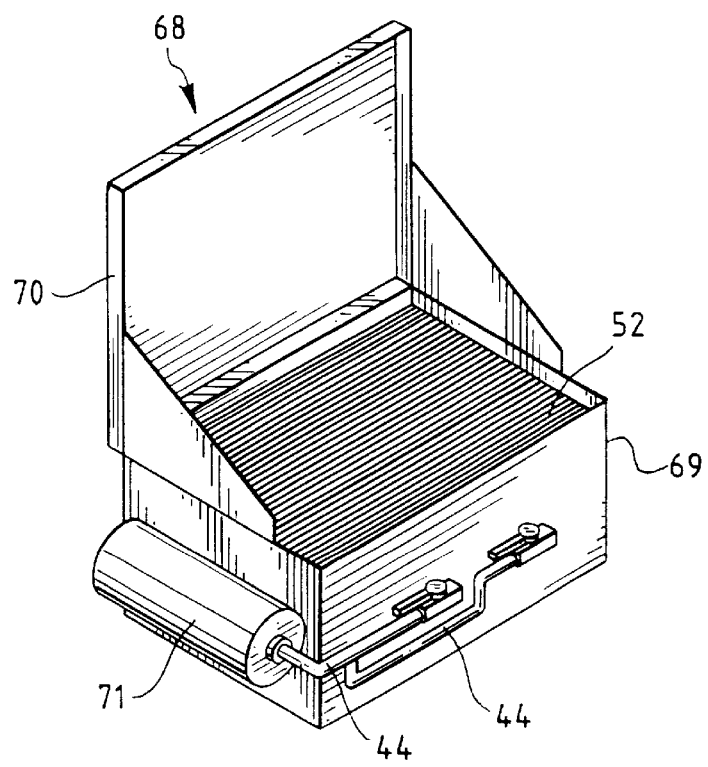
FIG. 14 is a perspective view of the portable liquid gas grill of the present invention.

As seen in FIG. 14, a portable structure 68 enables users to conveniently transport the liquid gas grill when traveling or camping, for example. Portable structure 68 comprises a metal box 69, having a lid 70 at the top of the box 69. Preferably, box 69 is approximately 15 inches wide, 30 inches long, and 8 inches in height. A miniature gas tank 71, preferably a 1 pound tank, is attached to the side of the box 69 by means of suitable fasteners. Two connecting tubes 44, leading from the miniature gas tank 71, connect the miniature gas tank 71 to the two bubblers 40. Each connecting tube 44 includes a regulating valve for increasing and decreasing the flow of gas to the bubbler. The bubblers, not shown in FIG. 14, are located at the bottom of box 69. Box 69 is divided into two halves by means of an aluminum or stainless steal wall, creating two liquid compartments, not shown in FIG. 14. Finally, portable structure 68 includes a grill rack 52, which is mounted above the liquid surface.

When operating portable structure 68, a user must fill up the liquid compartments to the desired level. Users may also add flavoring to the liquid. Next, users must place food on the grill rack and turn on the miniature gas tank 71. Then the gas may be ignited with a grill lighter. The lid 70 must remain open when cooking in order to provide oxygen for the flames.

The present invention may be embodied in still other specific forms without departing from the spirit or essential attributes thereof and, accordingly, the described embodiments are to be considered in all respects as being illustrative and not restrictive, with the scope of the invention being indicated by the appended claims, rather than the foregoing detailed description. Furthermore, the appended claims indicate the scope of the invention, as well as all modifications which may fall within the range of equivalency, which are also intended to be embraced therein.

I claim:

1. A liquid gas grill for cooking food comprising:

a bubbler operating beneath a liquid surface for dispersing a flammable gas into a plurality of bubbles which rise to and effuse from said liquid surface, said dispersing of said flammable gas being caused by said gas passing through one or more diffusing tubes and percolating outward from the tubes;

a lighting means for igniting said bubbles as said bubbles effuse from said liquid surface creating a plurality of flames immediately above said liquid surface; and a grill rack located above said liquid surface and said plurality of flames upon which food is placed to be cooked.

2. The liquid gas grill of claim 1, wherein said gas supply comprises at least one tank, and at least one hose, said hose having a proximal end and a distal end, where said proximal end is fixedly connected to said tank and said distal end is fixedly connected to said bubbler.

3. The liquid gas grill of claim 2, wherein said bubbler further comprises a cylindrical portion which is fixedly connected to said hose, having said one or more diffusing tubes fixedly connected to said cylindrical portion and radially extending therefrom.

4. The liquid gas grill of claim 1, wherein said liquid surface prevents the formation of flare-ups by extinguishing burning food substances.

5. A liquid gas grill conversion kit comprising:

a liquid container adapted in size and shape to fit inside an empty fuel cavity of a barbecue grill, located below a cooking surface of said barbecue grill, said liquid container housing a bubbler and being filled with a liquid, where a liquid surface covers said bubbler;

said bubbler dispersing a gas supply into a plurality of bubbles, said bubbles rising to the top of said liquid surface, departing from said liquid surface;

a lighting means which ignites said bubbles when said bubbles depart from said liquid, creating a plurality of flames on said liquid surface; and said gas supply comprising at least one tank, and at least one hose, said hose having a proximal end and a distal end, where said proximal end is fixedly connected to said tank and said distal end is fixedly connected to said bubbler.

6. A portable liquid gas grill, comprising:

a container having a lid connected thereto, and said container being filled with a liquid, and said container housing at least one bubbler located beneath a liquid surface and located below a grill rack;

said bubbler dispersing a gas supply into a plurality of bubbles, where said bubbles rise to the top of said liquid surface, departing from said liquid surface;

said bubbler dispersing a gas supply into a plurality of bubbles, said bubbles rising to the top of said liquid surface, departing from said liquid surface; and said gas supply comprising at least one tank fixedly connected to said container and having at least one hose, said hose having a proximal end and a distal end, where said proximal end is fixedly connected to said tank and said distal end is fixedly connected to said bubbler.

7. A method of grilling food articles with a liquid gas grill, comprising the steps of:

providing a bubbler operating beneath a liquid surface for dispersing a flammable gas into a plurality of bubbles which rise to and effuse from said liquid surface, said dispersing of said flammable gas being caused by said gas passing through one or more diffusing tubes and percolating outward from the tubes;

igniting said bubbles as said bubbles effuse from said liquid surface creating a plurality of flames immediately above said liquid surface; and providing a grill rack located above said liquid surface and said plurality of flames upon which food is placed to be cooked.

8. The method of claim 7, wherein said step of providing a bubbler further includes the step of providing at least one tank, and at least one hose, said hose having a proximal end and a distal end, where said proximal end is fixedly connected to said tank and said distal end is fixedly connected to said bubbler.

9. The method of claim 8, further comprising the steps of: providing a cylindrical portion which is fixedly connected to said hose, having said one or more diffusing tubes fixedly connected to said cylindrical portion and radially extending therefrom.

10. The method of claim 7 further comprising the step of preventing the formation of flare-ups by utilizing said liquid surface to extinguish burning food substances.

* * * * *